United States Patent [19]

Omura et al.

[11] 3,897,428

[45] July 29, 1975

[54] DODECENOIC ACID AMIDES

[75] Inventors: Satoshi Omura; Iwao Umezawa; Toju Hata; Minoru Shindo; Masakazu Mizoguchi; Nobuhiro Oi; Tomoharu Uchiyama, all of Tokyo, Japan

[73] Assignees: Chugai Seiyaku Kabushiki Kaisha; The Kitasato Institute, both of Tokyo, Japan

[22] Filed: Oct. 30, 1973

[21] Appl. No.: 411,024

[30] Foreign Application Priority Data

Nov. 11, 1972 Japan.............................. 47-112581

[52] U.S. Cl....260/247.7 H; 260/293.86; 260/326.5 E; 260/404; 260/561 K; 424/248; 424/267; 424/274; 424/320
[51] Int. Cl............................................ C07d 295/18
[58] Field of Search..... 260/247.2 A, 293.86, 326.5, 260/561 K, 404, 247.7 H

[56] References Cited
UNITED STATES PATENTS
3,751,479    8/1973    Liddell et al.................. 260/593 R Primary Examiner—G. Thomas Todd
Attorney, Agent, or Firm—Browdy and Neimark

[57] ABSTRACT

Novel dodecenoic acid derivatives represented by the formula

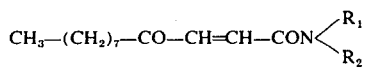

wherein $R_1$ and $R_2$ are as hereinafter defined, which exhibit hypocholesteremic, antilipidemic, antibacterial and antifungal activities are disclosed.

21 Claims, No Drawings

DODECENOIC ACID AMIDES

BACKGROUND OF THE INVENTION

1. Field of the Invention

This invention relates to a novel dodecenoic acid derivatives useful as pharmaceuticals. More particularly, this invention relates to novel 4-keto-2-dodecenamides represented by the formula

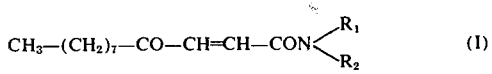

wherein $R_1$ and $R_2$ may be the same or different and each represents a hydrogen atom, a substituted or unsubstituted lower alkyl group, a substituted or unsubstituted lower alkenyl group, a substituted or unsubstituted cycloalkyl group or a substituted or unsubstituted aralkyl group, or $R_1$ and $R_2$ may, when taken together, form a heterocyclic group.

The 4-keto-2-dodecenamides represented by the formula (I) above are novel compounds and are useful as pharmaceuticals because of their excellent hypocholesteremic, antilipidemic, antibacterial and antifungal activities and their low toxicity in mammals.

2. Summary of the Invention

An object of this invention is therefore to provide novel 4-keto-2-dodecenamides useful as pharmaceuticals.

DETAILED DESCRIPTION OF THE INVENTION

The compounds of the present invention represented by the formula (I) can be obtained by reacting 4-keto-2-dodecenoic acid or a reactive derivative thereof with an amine represented by the formula

wherein $R_1$ and $R_2$ are as defined above.

It has been reported that the starting material, 4-keto-2-dodecenoic acid, used in the preparation of the compounds of this invention can be produced from octyl methyl ketone and chloral via a two-step reaction. However, the present inventors found that the starting material can be produced in high yield by a single reaction step comprising reacting octyl methyl ketone with glyoxylic acid in glacial acetic acid while heatrefluxing.

The reactive derivatives of 4-keto-2-dodecenoic acid include acid halides, an acid anhydride, esters of 4-keto-2-dodecenoic acid, and the like. These reactive derivatives can easily be derived from 4-keto-2-dodecenoic acid by one of the well-known methods. For example, an acid halide can be prepared by reacting 4-keto-2-dodecenoic acid with phosphorus pentachloride, phosphorus oxychloride, phosphorus trichloride, thionyl chloride and the like as a halogenating agent. A mixed acid anhydride of 4-keto-2-dodecenoic acid can be prepared by reacting the acid with a halogenated formic acid ester such as isobutyl chloroformate. In preparing an ester of 4-keto-2-dodecenoic acid, 4-keto-2-dodecenoic acid is preferably reacted with ethylene glycol or the like to form the corresponding acid where a carbonyl group at 4-position is protected with a protective group and the resulting protected acid is then reacted with an esterifying agent such as p-nitrophenol and the like whereby an active ester of 4-keto-2-dodecenoic acid having a portective group at 4-position can be obtained. In the above ester, the protective group can be split off after the ester is reacted with the above defined amine to obtain the desired product of this invention.

Other starting materials, i.e., amines, used in preparing the compounds of this invention include ammonia, mono- or dialkylamines in which the alkyl moiety may be a straight or branched chain and contains 1 to 6 carbon atoms such as methylamine, diethylamine, propylamine, diisobutylamine, t-butylamine and the like, mono- or di-lower alkenyl group such as allylamine, diallylamine and the like, cycloalkylamines such as cyclohexylamine, aralkylamines such as benzylamine, substituted alkylamines such as ethanolamine, diethanolamine, heterocyclic amines such as pyrrolidine, piperidine, morpholine, and the like.

In preparing the compounds of this invention, the starting materials can be subjected to reaction conditions used in the general acid amide formation. For example, the reaction between a mixed anhydride of 4-keto-2-dodecenoic acid and an amine can advantageously be carried out in an equimolar proportion in an inert solvent such as toluene, tetrahydrofuran and the like at a relatively low temperature, e.g., temperatures between −5° and −15°C. A basic adjuvant such as triethylamine, etc. may be present in the reaction whereby the reaction proceeds smoothly. When a 4-keto-dodecenoic acid halide is used as a starting material, an amine is preferably used in a slightly excess amount, and the reaction is conducted in an inert solvent such as diethyl ether at a relatively low temperature.

When an ester of 4-keto-2-dodecenoic acid is used as a starting material, it is reacted with an amine and an inert solvent such as chloroform, preferably in the presence of a basic adjuvant such as triethylamine and the like, at room temperature for a period of several hours. A better result can be obtained by heat-refluxing the reaction mixture for a while in order to ensure the completion of the reaction. The desired products are sometimes oily substances at room temperature and can be purified by the well-known methods such as column chromatography.

The 4-keto-2-dodecenamides thus obtained are novel compounds, not previously described in literature and are useful as pharmaceuticals because of their excellent hypocholesteremic, antilipidemic, antibacterial and antifungal activities.

The present invention is further illustrated by the following experiment and examples, but they are not to be construed as limiting the scope of this invention.

EXPERIMENT

Solutions of each of the compounds listed in Table 1 below dissolved in aseptic distilled water (containing an organic solvent such as methanol, acetone, etc. as the case may be) prepared in the serial dilution method were added to agar media (ordinary agar media for the antibacterial activity test and potato agar media for the antifungal activity test) to prepare a series of agar plates containing various concentrations of each of the compounds of this invention. The media were then inoculated with the test microorganisms listed in Table 1 and the inoculated media were incubated for 24 hours at 37°C (the antibacterial activity test) or 72 to 96 hours at 27°C (the antifungal activity test). At the end of the incubation, the growth of the test microorganisms in each media was observed microscopically (with the naked eye) and the minimum inhibitory concentration (MIC) of each test compound was determined by the standard method. The results obtained are shown in Table 1 below.

Analysis

Calcd. for $C_{18}H_{29}NO_2$: C, 74.18; H, 10.03; N, 4.81

Found: C, 73.83; H, 10.32; N, 4.76

IR Spectrum (Thin Film Method, hereinafter the same)

1700, 1645, 1620 and 970 cm$^{-1}$

Table 1

Antibacterial and Antifungal Activities $CH_3.(CH_2)_7.CO.CH{=}CH.CO.N{<}^{R_1}_{R_2}$

| Compound | | MIC (μg/ml) | | | | | |
|---|---|---|---|---|---|---|---|
| $R_1$ | $R_2$ | B.s.* | S.a.* | M.* | E.c.* | P.o.* | T.r.* |
| —CH$_3$ | —CH$_3$ | 6.25 | 3.12 | 6.25 | 3.12 | 6.25 | 6.25 |
| —CH$_2$CH=CH$_2$ | —CH$_2$CH=CH$_2$ | 12.5 | 6.25 | 3.12 | 6.25 | 12.5 | 12.5 |
| —CH$_3$ | —⟨H⟩ | 12.5 | 3.12 | 12.5 | 6.25 | 6.25 | 12.5 |
| —CH$_2$CH$_3$ | —CH$_2$CH$_3$ | 12.5 | 3.12 | 12.5 | 3.12 | 12.5 | 6.25 |
| —CH(CH$_3$)$_2$ | —CH(CH$_3$)$_2$ | >100 | 6.25 | 12.5 | 12.5 | >100 | >100 |
| —CH$_2$CH=CH | H | >100 | 3.12 | 50 | 3.12 | >100 | 12.5 |
| tert—C$_4$H$_9$ | H | 6.25 | 1.56 | 25 | 1.56 | 3.12 | 25 |
| —CH$_2$—⟨⟩ | —CH$_2$—⟨⟩ | >100 | >100 | >100 | >100 | 3.12 | 6.25 |
| —CH$_2$CH$_2$CH$_2$CH$_2$— | | 6.25 | 1.56 | 12.5 | 1.56 | — | 1.56 |
| —CH$_2$CH$_2$CH$_2$CH$_2$CH$_2$— | | 12.5 | 3.12 | 25 | 1.56 | — | 6.25 |
| —CH$_2$CH$_2$CH$_3$ | H | 100 | 1.56 | 25 | 1.56 | — | 100 |
| —CH$_2$CH$_2$OH | H | 12.5 | 0.8 | 25 | 0.8 | 12.5 | 12.5 |
| —CH(CH$_3$)$_2$ | H | >100 | 0.8 | 6.25 | 100 | 100 | 1.56 |

*B.s.: Bacillus subtilis PCI 219; S.a.: Staphylococcus aureus FDA 209; M.: Mycobacterium ATCC 607; E.c.: E. coli NIHJ; P.o.: Piricularia oryzae; T.r.: Trichophyton rubrum.

EXAMPLE 1

0.50 g of 4-keto-2-dodecenoic acid and 0.25 g of triethylamine were dissolved in 10 ml of toluene, and 0.25 g of isobutyl chloroformate was added dropwise to the solution at a temperature between −10° and −15°C while stirring. After stirring at that temperature for an additional 30 minutes, a solution of 0.11 g of dimethylamine in 10 ml of toluene was added to the mixture and the resulting mixture was stirred at a temperature of from −10° to −15°C for 30 minutes and subsequently at room temperature for 1 hour. The precipitated triethyl amine hydrochloride was filtered, and the filtrate was concentrated under reduced pressure. 100 ml of diethyl ether was added to the residue and the mixture was washed successively with 5 percent aqueous sodium carbonate and water, dried over anhydrous sodium sulfate and distilled under reduced pressure to remove the solvent. The residue thus obtained was then chromatographed using a silica gel column and a benzene-chloroform-diethyl ether mixture as an eluent, and the solvent system was removed from the resulting eluate under reduced pressure to obtain 0.36 g of N,N-dimethyl-4-keto-2-dodecenamide having a melting point of 43°C as white crystals.

Analysis

Calcd. for $C_{14}H_{25}NO_2$: C, 70.25; H, 10.53; N, 5.85

Found: C, 70.34; H, 10.71; N, 5.94

EXAMPLE 2

In the same manner as described in Example 1 but using 0.50 g of 4-keto-2-dodecenoic acid and 0.24 g of diallylamine, there was obtained 0.36 g of N,N-diallyl-4-keto-2-dodecenamide as a yellow oil.

EXAMPLE 3

In the same manner as described in Example 1 but using 0.50 g of 4-keto-2-dodecenoic acid and 0.27 g of N-methyl-N-cyclohexylamine, there was obtained 0.40 g of N-methyl-N-cyclohexyl-4-keto-2-dodecenamide as a yellow oil.

Analysis

Calcd. for $C_{19}H_{33}NO_2$: C, 74.22; H, 10.82; N, 4.54

Found: C, 74.37; H, 11.24; N, 4.61

IR Spectrum 1695, 1640, 1620 and 970 cm$^{-1}$

EXAMPLE 4

In the same manner as described in Example 1 but using 0.50 g of 4-keto-2-dodecenoic acid and 0.18 g of diethylamine, there was obtained 0.32 g of N,N-diethyl-4-keto-2-dodecenamide as a yellow oil.

Analysis

Calcd. for $C_{16}H_{29}NO_2$: C, 71.86; H, 10.93; N, 5.24

Found: C, 71.88; H, 11.25; N, 5.21

IR Spectrum 1700, 1640, 1620 and 970 cm$^{-1}$

EXAMPLE 5

In the same manner as described in Example 1 but using 0.50 g of 4-keto-2-dodecenoic acid and 0.24 g of cyclohexylamine, there was obtained 0.20 g of N-cyclohexyl-4-keto-2-dodecenamide as white crystals having a melting point of 140° to 141°C.

Analysis

Calcd. for $C_{18}H_{31}NO_2$: C, 73.67; H, 10.65; N, 4.77

Found: C, 73.93; H, 10.93; N, 4.92

EXAMPLE 6

In the same manner as described in Example 1 but using 0.50 g of 4-keto-2-dodecenoic acid and 0.24 g of N,N-diisopropyl-4-keto-2-dodecenamide as a yellow oil.

Analysis

Calcd. for $C_{18}H_{33}NO_2$: C, 73.17; H, 11.26; N, 4.74

Found: C, 73.22; H, 11.30; N, 4.59

IR Spectrum 1695, 1640, 1615 and 970 cm$^{-1}$

EXAMPLE 7

In the same manner as described in Example 1 but using 0.50 g of 4-keto-2-dodecenoic acid and 0.31 g of diisobutylamine, there was obtained 0.36 g of N,N-diisobutyl-4-keto-2-dodecenamide as a yellow oil.

Analysis

Calcd. for $C_{20}H_{37}NO_2$: C, 74.25; H, 11.53; N, 4.33

Found: C, 74.30; H, 11.30; N, 4.21

IR Spectrum 1695, 1640, 1615 and 970 cm$^{-1}$

EXAMPLE 8

0.50 g of 4-keto-2-dodecenoic acid and 0.25 g of triethylamine were dissolved in 10 ml of tetrahydrofuran, and 0.25 g of isobutyl chloroformate was added dropwise to the solution at a temperature between −10° and −15°C while stirring. After stirring at that temperature for an additional 30 minutes, a solution of 0.26 g of benzylamine in 10 ml of tetrahydrofuran was added to the mixture and the resulting mixture was stirred at a temperature of from −10° to −15°C for 30 minutes and subsequently at room temperature for 1 hour. The precipitated triethyl amine hydrochloride was filtered, and the filtrate was concentrated under reduced pressure. 100 ml of chloroform was added to the residue and the mixture was washed with a saturated aqueous sodium chloride, dried over anhydrous sodium sulfate and distilled under reduced pressure to remove the solvent. Diethyl ether was added to the resulting residue to crystallize. Recrystallization from acetone gave 0.20 g of N-benzyl-4-keto-2-dodecenamide having a melting point of 138° to 139°C as white crystals.

Analysis

Calcd. for $C_{19}H_{27}NO_2$: C, 75.71; H, 9.03; N, 4.65

Found: C, 75.42; H, 8.86; N, 4.49

EXAMPLE 9

In the same manner as described in Example 8 but using 0.50 g of 4-keto-2-dodecenoic acid and 0.14 g of allylamine, there was obtained 0.16 g of N-allyl-4-keto-2-dodecenamide having a melting point of 112°C as white crystals.

Analysis

Calcd. for $C_{15}H_{25}NO_2$: C, 71.67; H, 10.03; N, 5.57

Found: C, 71.59; H, 9.84; N, 5.39

EXAMPLE 10

0.50 g of 4-keto-2-dodecenoic acid and 0.25 of triethylamine were dissolved in 10 ml of tetrahydrofuran, and 0.25 g of isobutyl chloroformate was added dropwise to the solution at a temperature between −10° and −15°C while stirring. After stirring at that temperature for an additional 30 minutes, a solution of 0.18 g of t-butylamine in 10 ml of tetrahydrofuran was added dropwise to the mixture and the resulting mixture was stirred at a temperature of from −10° to −15°C for 30 minutes and subsequently at room temperature for 1 hour. The precipitated triethylamine hydrochloride was filtered, and the filtrate was concentrated under reduced pressure. 100 ml of chloroform was added to the residue and the mixture was washed with a saturated aqueous sodium chloride, dried over anhydrous sodium sulfate and distilled under reduced pressure to remove the solvent. The residue thus obtained was then chromatographed using a silica gel column and benzene-chloroformdiethyl ether mixture as an eluent, and the eluate was concentrated under reduced pressure to obtain 0.20 g of N-t-butyl-4-keto-2-dodecenamide having a melting point of 62°C as white crystals.

Analysis

Calcd. for $C_{16}H_{29}NO_2$: C, 71.86; H, 10.93; N, 5.24

Found: C, 71.82; H, 10.91; H, 5.13

EXAMPLE 11

In the same manner as described in Example 10 but using 0.50 g of 4-keto-2-dodecenoic acid and 0.47 g of dibenzylamine, there was obtained 0.42 g of N,N-dibenzyl-4-keto-2-dodecenamide as a yellow oil.

Analysis

Calcd. for $C_{26}H_{33}NO_2$: C, 79.75; H, 8.50; N, 3.58

Found: C, 80.04; H, 8.70; N, 3.66

IR Spectrum 1700, 1640, 1620 and 970 cm$^{-1}$

EXAMPLE 12

In the same manner as described in Example 10 but using 0.50 g of 4-keto-2-dodecenoic acid and 0.25 g of diethanolamine, there was obtained 0.20 g of N,N-bis-hydroxyethyl-4-keto-2-dodecenamide as a yellow oil.

Analysis

Calcd. for $C_{16}H_{29}NO_4$: C, 64.18; H, 9.76; N, 4.68

Found: C, 64.25; H, 9.81; N, 4.59

IR Spectrum 3400, 1695, 1640, 1610 and 960 cm$^{-1}$

EXAMPLE 13

In the same manner as described in Example 10 but using 0.50 g of 4-keto-2-dodecenoic acid and 0.17 g of pyrrolidine, there was obtained 0.15 g of N-(4-keto-2-dodecenoyl)-pyrrolidine as a yellow oil.

Analysis

Calcd. for $C_{16}H_{27}NO_2$: C, 72.41; H, 10.26; N, 5.28

Found: C, 72.45; H, 10.22; N, 5.31

IR Spectrum 1700, 1645, 1620 and 975 cm$^{-1}$

EXAMPLE 14

In the same manner as described in Example 10 but using 0.50 g of 4-keto-2-dodecenoic acid and 0.20 g of piperidine, there was obtained 0.31 g of N-(4-keto-2-dodecenoyl)-piperidine as a yellow oil.

Analysis

Calcd. for $C_{17}H_{29}NO_2$: C, 73.07; H, 10.46; N, 5.01

Found: C, 73.15; H, 10.51; N, 5.00

IR Spectrum 1700, 1645, 1620 and 975 cm$^{-1}$

EXAMPLE 15

In the same manner as described in Example 10 but using 0.50 g of 4-keto-2-dodecenoic acid and 0.14 g of n-propylamine, there was obtained 0.20 g of N-n-propyl-4-keto-2-dodecenamide as white crystals having a melting point of 116°C.

Analysis
Calcd. for $C_{15}H_{27}NO_2$: C, 71.10; H, 10.74; N, 5.53
Found: C, 71.21; H, 10.75; N, 5.50

EXAMPLE 16

0.50 g of 4-keto-2-dodecenoic acid and 0.25 g of triethylamine were dissolved in 10 ml of tetrahydrofuran, and 0.25 g of isobutyl chloroformate was added dropwise to the solution at a temperature between −10° and −15°C while stirring. After stirring at that temperature for an additional 30 minutes, a solution of 0.15 g of ethanolamine in 10 ml of tetrahydrofuran was added dropwise to the mixture and the resulting mixture was stirred at a temperature of from −10° to −15°C for 30 minutes and subsequently at room temperature for 1 hour. The precipitated triethylamine hydrochloride was filtered, and the filtrate was concentrated under reduced pressure. 100 ml of chloroform was added to the residue, and the mixture was washed with a saturated aqueous sodium chloride, dried over anhydrous sodium sulfate and distilled under reduced pressure to remove the solvent. Petroleum ether was added to the residue to crystallize. Recrystallization from acetone gave 0.17 g of N-hydroxyethyl-4-keto-2-dodecenamide having a melting point of 119° to 120°C as white crystals.

Analysis
Calcd. for $C_{14}H_{25}NO_3$: C, 65.85; H, 9.87; N, 5.49
Found: C, 65.71; H, 9.85; N, 5.35

EXAMPLE 17

In the same manner as described in Example 16 but using 0.50 g of 4-keto-2-dodecenoic acid and 0.14 g of isopropylamine, and recrystallizing from diethyl ether, there was obtained 0.18 g of N-isopropyl-4-keto-2-dodecenamide as white crystals having a melting point of 116° to 117°C.

Analysis
Calcd. for $C_{15}H_{27}NO_2$: C, 71.10; H, 10.74; N, 5.53
Found: C, 70.77; H, 10.71; N, 5.44

EXAMPLE 18

A solution of 0.38 g of phosphorus pentachloride in 10 ml of diethyl ether was added dropwise to a solution of 0.26 g of 4-keto-2-dodecenoic acid in 10 ml of diethyl ether at a temperature of 5°C. After the resulting mixture was stirred at room temperature for 1 hour, the phosphorus oxychloride thus formed was completely removed under reduced pressure. 10 ml of diethyl ether was then added thereto. To the resulting mixture was added dropwise a solution of 0.08 g of dimethylamine in 10 ml of diethyl ether at a temperature between −5° and −10°C. After stirring at that temperature for 30 minutes, the solvent was distilled off under reduced pressure. 50 ml of chloroform was added to the residue and the mixture was washed with saturated aqueous sodium chloride, dried over anhydrous sodium sulfate and distilled under reduced pressure to remove the solvent. The residue thus obtained was then chromatographed using a silica gel column and a benzene-chloroform-diethyl ether mixture as an eluent, and the eluate was concentrated to obtain 0.08 g of N,N-dimethyl-4-keto-2-dodecenamide as white crystals. The product thus obtained did not show a depression in melting point when admixed with the product obtained in Example 1.

EXAMPLE 19

A mixture of 18 ml of ethylene glycol and 10 ml of benzene was heated and a fraction of about 20 ml was distilled off. To the resulting solution was added 1.8 g of 4-keto-2-dodecenoic acid followed by 3.7 g of p-toluene sulfonic acid, and the mixture was heated while stirring for 40 minutes, during which time about 0.2 ml of water was distilled off. The reaction mixture was poured into 50 ml of a 5 percent aqueous sodium bicarbonate. The benzene layer was separated, washed with water and dried over anhydrous sodium sulfate. Upon distillation of the solvent, there was obtained 2.6 g of oily 4-ethylenedioxy-2-dodecenoic acid-p-hydroxyethyl ester. The product was heat-refluxed in a solution of 1.6 g of sodium hydroxide in 20 ml of methanol for 2 hours. The reaction mixture was made acidic with a 5 percent sulfuric acid and extracted with diethyl ether. The extract was washed with water and dried over anhydrous sodium sulfate, and the solvent was then removed by distillation. Recrystallization of the crystalline substance contained in the residue from n-hexane yielded 1.4 g of 4-ethylenedioxy-2-dodecenoic acid having a melting point of 74° to 75°C. 0.88 g of p-nitrophenol and 40 ml of chloroform were added to the thus obtained product and the resulting mixture was cooled to 0°C. To the mixture was added 1.4 g of dicyclohexyl carbodiimide while stirring. After reaction at a temperature between 5° and 20°C for a period of 3 hours, the reaction mixture was ice-cooled to form precipitates which were then filtered, and the filtrate was concentrated under reduced pressure. 40 ml of ethyl acetate was added to the resulting residue and insoluble materials were removed by filtration. The filtrate was concentrated to dryness to obtain 2.4 g of oily 4-ethylenedioxy-2-dodecenoic acid-p-nitrophenyl ester.

To the thus obtained ester were added 0.9 g of dimethylamine hydrochloride and 50 ml of chloroform, and the resulting mixture was stirred at room temperature for 6 hours followed by heat-refluxing for 30 minutes. The reaction mixture was washed successively with an aqueous sodium bicarbonate and water and dried over anhydrous sodium sulfate. After distilling off the chloroform, there was obtained 1.5 g of oily N,N-dimethyl-4-ethylenedioxy-2-dodecenamide. A mixture of the thus obtained product, 10 ml of a 5 percent sulfuric acid and 50 ml of ethanol was heat-refluxed for 2 hours and then concentrated under reduced pressure. The residue was extracted with diethyl ether, the extract washed with aqueous sodium chloride, dried over anhydrous sodium sulfate and the ether distilled off under reduced pressure. Recrystallization from petroleum ether gave 1.1 g of N,N-dimethyl-4-keto-2-dodecenamide. This product did not show a drop in melting point when admixed with the product obtained in Example 1.

EXAMPLE 20

In the same manner as described in Example 19 but using 1.8 g of 4-keto-2-dodecenoic acid and 0.8 g of methylamine hydrochloride, there was obtained 0.9 g of N-methyl-4-keto-2-dodecenamide having a melting point of 119° to 120°C.

Analysis

Calcd. for $C_{13}H_{23}NO_2$: C, 69.30; H, 10.29; N, 6.21
Found: C, 69.04; H, 10.28; N, 6.27

EXAMPLE 21

In the same manner as described in Example 19 but using 1.8 g of 4-keto-2-dodecenoic acid and 2.0 g of a 17 percent ammoniacal methanol, there was obtained 0.5 g of 4-keto-2-dodecenamide having a melting point of 138° to 139°C.

Analysis

Calcd. for $C_{12}H_{21}NO_2$: C, 68.20; H, 10.01; N, 6.62
Found: C, 68.23; H, 10.01; N, 6.70

EXAMPLE 22

In the same manner as described in Example 19 but using 1.8 g of 4-keto-2-dodecenoic acid and 1.0 g of morpholine, there was obtained 0.8 g of N-(4-keto-2-dodecenoyl)-morpholine having a melting point of 182° to 183°C.

Analysis

Calcd. for $C_{16}H_{27}NO_3$: C, 68.29; H, 9.67; N, 4.98
Found: C, 68.32; H, 9.70; N, 4.94

What is claimed is:

1. A 4-keto-2-dodecenamide represented by the formula

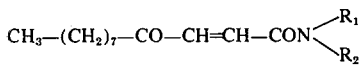

wherein $R_1$ and $R_2$ may be the same or different and each represents hydrogen, alkyl having 1–6 carbon atoms, allyl, cyclohexyl, benzyl or hydroxyethyl or $R_1$ and $R_2$ may, when taken together with the nitrogen atom, form pyrrolidino, piperidino or morpholino.

2. N,N-Dimethyl-4-keto-2-dodecenamide in accordance with claim 1.

3. N,N-Diallyl-4-keto-2-dodecenamide in accordance with claim 1.

4. N-Methyl-N-cyclohexyl-4-keto-2-dodecenamide in accordance with claim 1.

5. N,N-Diethyl-4-keto-2-dodecenamide in accordance with claim 1.

6. N-Cyclohexyl-4-keto-2-dodecenamide in accordance with claim 1.

7. N,N-Diisopropyl-4-keto-2-dodecenamide in accordance with claim 1.

8. N,N-Diisobutyl-4-keto-2-dodecenamide in accordance with claim 1.

9. N-Benzyl-4-keto-2-dodecenamide in accordance with claim 1.

10. N-Allyl-4-keto-2-dodecenamide in accordance with claim 1.

11. N-t-Butyl-4-keto-2-dodecenamide in accordance with claim 1.

12. N,N-Dibenzyl-4-keto-2-dodecenamide in accordance with claim 1.

13. N,N-Bis-hydroxyethyl-4-keto-dodecenamide in accordance with claim 1.

14. N-(4-Keto-2-dodecenoyl)-pyrrolydine in accordance with claim 1.

15. N-(4-Keto-2-dodecenoyl)-piperidine in accordance with claim 1.

16. N-n-Propyl-4-keto-2-dodecenamide in accordance with claim 1.

17. N-Hydroxyethyl-4-keto-2-dodecenamide in accordance with claim 1.

18. N-Isopropyl-4-keto-2-dodecenamide in accordance with claim 1.

19. N-Methyl-4-keto-2-dodecenamide in accordance with claim 1.

20. 4-Keto-2-dodecenamide in accordance with claim 1.

21. N-(4-Keto-2-dodecenoyl)-morpholine in accordance with claim 1.

* * * * *